July 18, 1961     H. W. TEMPLETON     2,992,817
METERING VALVE SEAL
Filed July 11, 1958     2 Sheets-Sheet 1
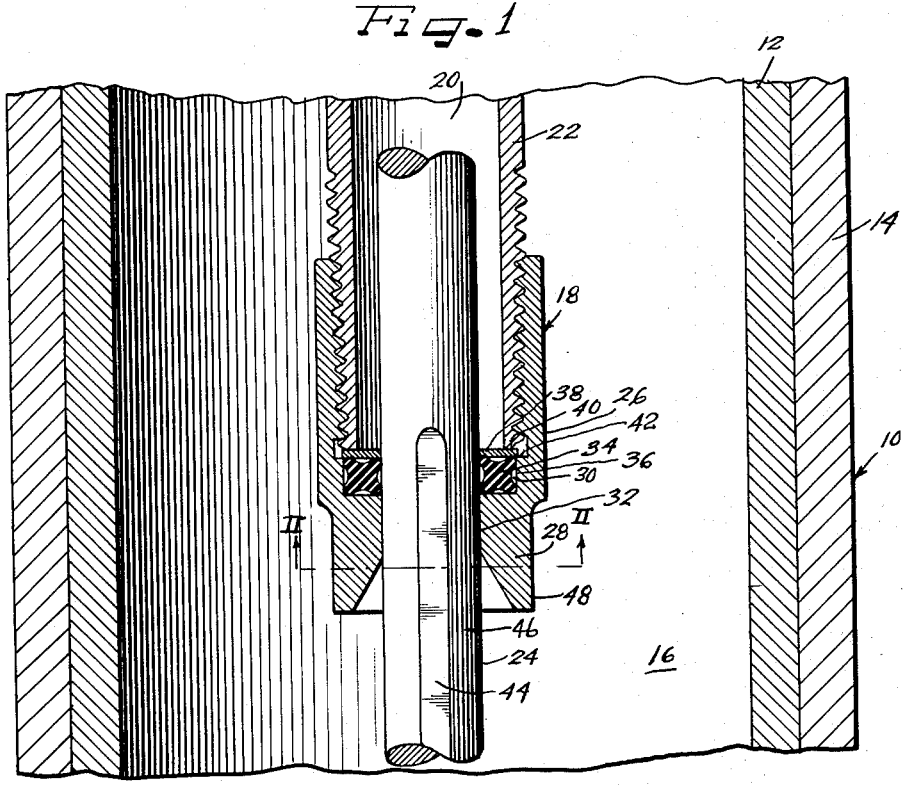
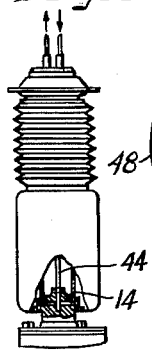 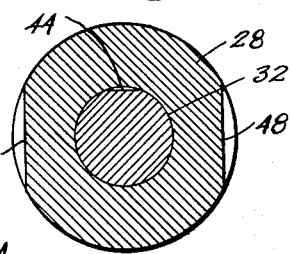 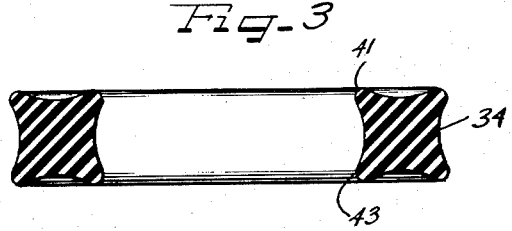
Inventor
Herbert W. Templeton
by   Hill, Sherman, Meroni, Gross & Simpson   Attys.

July 18, 1961 H. W. TEMPLETON 2,992,817
METERING VALVE SEAL
Filed July 11, 1958 2 Sheets-Sheet 2

Inventor
Herbert W. Templeton by Hill, Sherman, Meroni, Gross + Simpson Attys.

United States Patent Office 2,992,817
Patented July 18, 1961

2,992,817
METERING VALVE SEAL
Herbert W. Templeton, Southfield, Mich., assignor to Thompson Ramo Wooldridge Inc., a corporation of Ohio
Filed July 11, 1958, Ser. No. 748,026
12 Claims. (Cl. 267—64)

The present invention relates to improvements in automatic leveling devices for vehicles, and more particularly to a metering valve seal for use in controlling fluid flow in an automatic leveling suspension strut.

In a suspension system for a vehicle employing resilient hydro-pneumatic struts, a pressurized supply of fluid may be utilized to control the expansion of a chamber in the strut to provide a self-leveling means. In certain of these systems, the hydraulic fluid is metered through a flow control valve into the expansible chamber to establish the extension length of the strut and maintain the vehicle level with variations in load. A flow orifice is generally employed which controls the flow from the expansible chamber. Various other means may be utilized with the strut, such as a compressible and expansible gas element operatively exposed to the liquid chamber so as to transmit pressure forces therebetween and act as a resilient spring support for the vehicle.

The chamber is defined by a piston slidably reciprocable in a cylinder of the strut and accurate control of the rate of flow into the chamber is critical in providing quick return to level position after compression. Likewise, rebound expansion of the strut requires effective means to prevent flow into the chamber. The liquid leveling system may be of constant flow or modulated type wherein the delivery of replacement liquid to the expansible chamber is controlled by a metering rod for the metering valve which is reciprocably and telescopically received in a metering tube and metering orifice, the rod being adapted to vent a predetermined flow of fluid from a relatively high pressure chamber within the metering tube to the operating pressure within the expansion chamber during the level length condition of the strut. Contraction of the strut in response to road bumps or the like opens the metering valve further to increase the flow into the chamber to return the strut to its constant level length, and expansion of the strut would in a preferred embodiment, completely close the metering valve to prevent flow into the liquid chamber and in any event to limit the flow to permit return of the strut to its constant level lengh in response to continued flow from the expansible chamber. In this manner, the frame of the vehicle is retained at a constant level upon the road regardless of changes in the load placed on the frame as long as the fluid pressure in the metering tube is sufficiently great to support the load thereon. Where the metering orifice is defined by a bushing of the type previously used, manufacturing tolerances entail a certain amount of leakage in the limited or minimum flow position of the valve and variations in metering in the level flow and full flow positions of the valve, so that greater system volume is required and a slower return to level length results. The present invention provides a metering valve which includes a metering tube and metering rod or valve core as above described but wherein the metering valve completely closes when the strut is expanded. The tube carries a housing at one end thereof defining an orifice and a bushing which in one form of the invention may be disposed in sealed slidably snug relationship with the metering rod, although some allowance therebetween may be provided without interfering with the effective metering action of the valve.

In accordance with the invention, the housing defines a recess for receiving a resilient annular seal which is adapted to engage the rod in a close fitting sealing relationship therewith. The seal is disposed above the bushing provided by the housing and because of its effectiveness and the relatively looser fit which may be provided by metal portions of the bushing, reduced frictional resistance to movement of the metering rod within the metering tube is afforded, while the strut is enabled to return quickly to level length and the amount of fluid flow required is lessened as compared with previous constructions. The metering rod of the invention, which is adapted to cooperate with the seal in providing an accurate calibration of the flow into the expansible chamber, defines one or more flattened surfaces or grooves extending preferably from the lower end of the rod to a point such that in the level length position of the strut a predetermined relatively small portion thereof is disposed above the seal to afford a leak-down of fluid from the high pressure chamber in the metering tube to maintain the said level length. This construction of the metering rod permits a substantial circumferential portion of the metering rod to maintain an effective sealing relationship with the metering valve seal at all times, thus defining an accurately calibrated flow orifice with the seal in the level length and contracted positions of the strut, while the seal maintains a fully effective sealing engagement with the metering rod in the extended position of the strut.

Accordingly, it is an object of the present invention to provide a metering valve for an extensible strut in an automatic leveling system for road vehicles and the like, having a resilient metering valve seal which affords a quick return to level ride conditions after expansion or contraction of the strut.

Another object of the invention is to provide a metering valve seal as described which is effective in reducing system volume requirements for the leveling strut embodying the seal.

Another object of the invention is to provide a metering valve as described which includes a metering rod telescopically received in a metering tube and a bushing portion for the metering rod at the lower end of the metering tube, the metering rod having a flattened or grooved configuration along a predetermined length thereof and the bushing portion including a resilient seal adapted to cooperate with the rod in metering flow from the metering tube to an expansible chamber of the strut.

Another object of the invention is to provide a metering valve seal which permits greater tolerances between the bushing portion of the valve and the metering rod, the seal being effective to prevent flow during the phase of the stroke in which the strut is extended and to maintain an accurate rate of flow when the strut is in the level ride condition.

Another object of the invention is to provide a metering valve seal and metering valve structure which is simple in construction and may be readily manufactured at low cost without the need for special techniques or skills.

Other objects and advantages of the invention will become apparent as the description proceeds in accordance with the drawings in which:

FIGURE 1 is a vertical sectional view of the metering valve and seal structure of the invention;

FIGURE 2 is a transverse cross sectional view taken along the line II—II of FIGURE 1;

FIGURE 3 is an enlarged transverse cross sectional view of the resilient seal and flow control member;

FIGURE 4 is an elevational view, partly broken away, of the strut of the invention.

Figure 5:
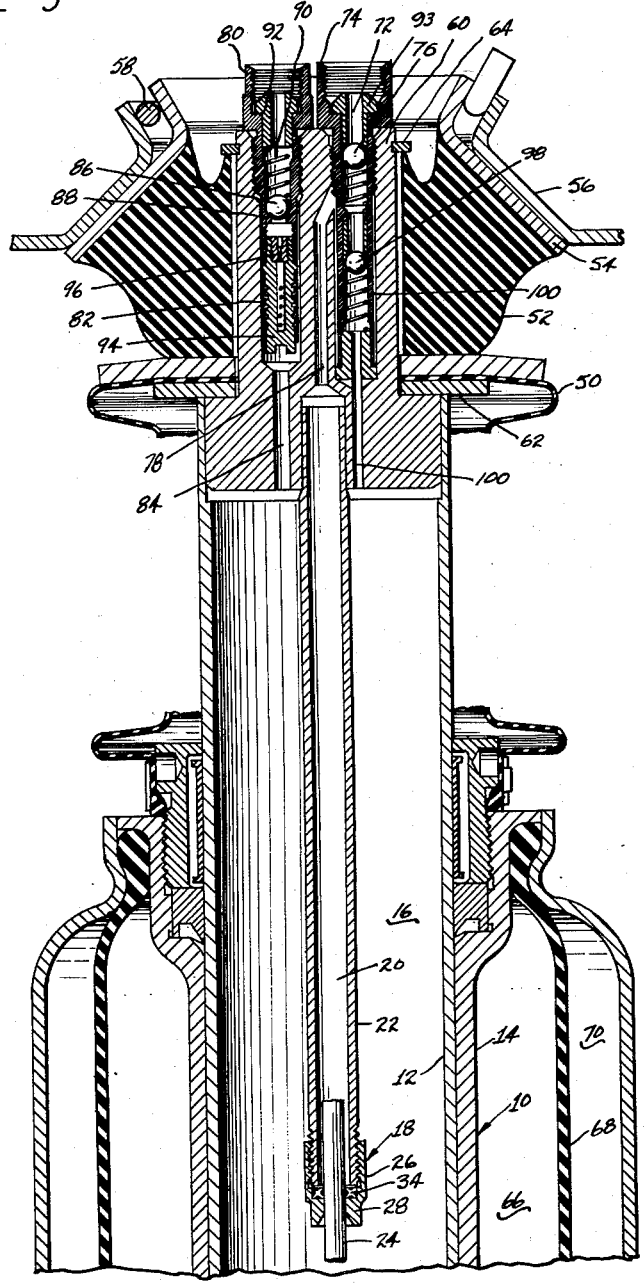
FIGURE 5 is an enlarged fragmentary vertical sectional view taken through a strut embodying the principles of the present invention.

As seen in FIGURE 1, the metering valve and seal of the invention may be used in a strut 10 for a self-leveling vehicle suspension system or the like, the strut 10 including a piston 12 slidably received within a cylinder 14. The piston 12 is hollow and defines a liquid chamber 16 therein in cooperation with the cylinder 14. The chamber 16 is preferably disposed in operative relationship with a hydro-pneumatic spring in accordance with the understanding of those skilled in the art, as shown, for example, in John P. Heiss application Serial No. 713,889, filed February 7, 1958, now Patent No. 2,915,307. Likewise, suitable means are provided to afford a limited flow from the chamber 16 to a reservoir at a lower pressure than the strut presure of chamber 16.

The lower end of the cylinder 14 is adapted to be connected to the axle of a vehicle and the upper end of the piston 12 is adapted to be connected to a vehicle frame or the like, and in the form of the invention shown, the strut 10 is of the modulated flow type. A metering valve 18 is provided in the strut 10 to afford a controlled fluid flow from a relatively high pressure chamber 20 in a metering tube 22 secured at its upper end coaxially to the piston 12, and suitable valve means are provided for permitting flow from the source of pressurized fluid into the chamber 20 in the metering tube 22. A metering rod or valve core 24 is telescopically disposed in reciprocable relationship within the meterng tube 22 and the valve rod is secured at its lower end to the bottom wall of the cylinder 14. Thus, when a road bump or the like is encountered such as to move the cylinder 14 upwardly, the metering rod 24 will move upwardly correspondingly in the metering tube 22.

To provide a flow orifice in cooperation with the rod 24, a housing 26 is theadedly secured to the lower end of the metering tube 22 which defines a bushing portion 28 in free sliding bearing relationship to the metering rod and an annular recess 30 above the bore 32 of the bushing portion 28. While the bore 32 may be in relatively close fitting relationship to the metering rod 24, a grooved or loose-fitting construction may be provided without interference with the operation of the valve as hereinafter set forth.

In accordance with the invention, a resilient, annular seal and flow control member 34 is disposed securely within the recess 30 in snug-fitting engagement with a back wall 36 thereof, and is held in position by means of a retaining ring or washer 38 in abutting engagement with the lower end 40 of the metering tube 22, and the shoulder 42 defined by the housing 26. Preferably, the seal 34 is generally square in cross section with concave sides to provide an indented or X shaped configuration so that two sealing edges or rims 41 and 43 on the inner periphery of the ring engage the rod 24 with a pocket therebetween and friction is reduced to a minimum. Similarly two edges or rims on each of the other sides of the ring engage their respective seats or abutments as shown to provide pockets therebetween accommodating deformation of the ring under axial load for forcing the edges 41 and 43 tighter against the rod 24. It will be noted that each edge 41 and 43 is on a beveled wiper lip provided at the inner ends of the legs of the X. In order to afford controlled flow of fluid to the operating pressure in the chamber 16 from the high pressure chamber 20, the metering rod 24 has a flattened portion 44 on one or both sides thereof. Alternatively, a grooved metering surface may be provided for this purpose, and in either case, the structure 44 is dimensioned to extend a predetermined, relatively small distance above the seal 34 in the level length condition of the strut so as to permit a controlled feed-flow of fluid at such time which will maintain the said level length condition.

The metering surface 44 may also be tapered within the concept of the invention so that a relatively reduced flow is afforded when the metering rod is in the level ride position shown and a greater flow is afforded when the strut is compressed, as by contact of a vehicle wheel with a road bump or the like so as to move the metering rod 24 upwardly into the metering tube 22. The increased flow resulting from such upward movement will thus effect an adjustment of the strut toward the level condition by expansion of the chamber 16. As such expansion continues, the strut 10 may move to an extended position, which may also be characterized as a rebound position. At such time, the metering rod 24 will move downwardly so that the full circumference of the rod, above the metering surfaces 44, will be received within the seal 34. The resilient characteristic of the seal will then be effective to provide complete sealing action relative to the rod 24, so that a complete no-flow condition is obtained and the amount of fluid in the chamber 16 is reduced until the level ride condition is again attained. Because no leakage occurs at such time, the return to the level length condition will be much faster than has been possible with previously available constructions, while reduction in system flow requirements is also afforded. Furthermore, there will be no leakage around the surfaces 46 intermediate the flow surfaces 44, and thus more accurate flow control is achieved when the valve is in metering position. The seal 34 may be set firmly in position and axially loaded by rotation of the housing 26 by means of the wrench flats 48, and this rotation may also afford an initial feed-flow setting such that the flow orifices provided by the seal and the surface 44 will provide a desired flow area. Referring to FIGURE 5, the operation of the device may be seen in relationship to fluid flow means therein, although certain details of the structure, such as the piston protecting bellows 50, will not be described in detail. Thus the piston 12 is shown as carrying frame supporting structure including a rubber collar 52, having a metal shell 54 receiving a frame 56 locked to the collar by a locking ring 58.

Sealing the upper end of the hollow piston 12 is a cylindrical metal block 60 which has flow passages bored therethrough, it being understood that the particular construction shown herein may be varied in accordance with the understanding of those skilled in the art. The block 60 has an enlarged lower end extending beneath a washer 62 on the piston 12 to lock it in place on top of the piston. It may further be locked by a snap ring 64 snapping into a groove at its upper end.

The chamber 16 communicates with a chamber 66 outside the cylinder 14 by passageways beneath the lower end of the cylinder 14. The non-compressible liquid within the chamber 16 thus presses against the bladder 68 and the resiliency of the air in the chamber 70 is transmitted to the piston 12 which carries the frame 56 of the vehicle.

The quantity of the liquid pumped into the chamber 16 within the piston 12 will determine the height of the piston and this quantity will be increased or decreased depending upon the amount of compression of the air within the chamber 70 with the load on the frame 56 of the vehicle.

Leveling liquid is delivered to the chamber 44 through a passageway 72 in a fitting 74 threaded into the top of the block 60. The liquid continues to flow downwardly past a check valve 76 through a passageway 78 communicating with the elongated interior flow chamber 20 in the metering tube 22.

Thus, it is seen that the metering tube 22 is attached to the block 60 to move with the piston 12, and the metering rod or valve core 24 moves with the cylinder 14, since it is secured at its lower end to the bottom wall of the cylinder 14, as hereinabove described and as shown in FIGURE 4. Control of the liquid in the chamber 22 is afforded by the valve 18. A flow restricting assembly may be provided including an elongated tubular shaped carrier member 80 having external threads to be threaded into an elongated cylindrically shaped conduit 82 extending from the outer end of the block 60 and having a smaller extension 84 communicating with the chamber 16 within the piston. Within a passageway extending completely through the carrier 80 is located a ball check valve 86 held against a seat 88 by a compression spring 90. This spring is held in position by a spring retaining sleeve 92, similar to sleeve 93.

A filter body 94 may also be threaded into the carrier 80. This body may have a plug 96 defining a flow restricting orifice to limit the flow from the piston chamber 16, in order that the amount of liquid in the said chamber 16 will control the extension of the strut 10, as described. The flow area of the orifice in the plug 96 is smaller than the maximum flow area through the valve 18 to maintain the liquid pressure within the chamber 16.

A continual pressurized supply of liquid is thus directed into the chamber 16 within the piston 12, through the passage 78. A normal flow of liquid may pass through the check valve 76, but a check valve 98 will remain closed. Check valve 98 is positioned in the flow passageway 100 leading directly to the chamber 16, and is backed with a spring 102 of sufficient strength to normally maintain the said closed position of the check valve 98.

The number of parts required in the metering valve seal of the invention are few and their construction is simple, so that the cost of manufacture of the device is relatively small in comparison with structures requiring close tolerances and the like. The quick return action of the strut afforded by the seal assures an extremely constant level ride condition while a substantially identical level ride condition may be maintained at each of the wheels of a vehicle on which the strut is used by the elimination of unplanned for feed-flow in the valve.

Although I have herein set forth and described my invention with respect to certain specific principles and details thereof, it will be appreciated by those skilled in the art that these may be varied without departing from the spirit and scope of the invention as set forth in the hereunto appended claims.

I claim as my invention:

1. In a vehicle levelling strut having a piston secured to a vehicle frame or the like, a cylinder secured to a vehicle axle or the like, and an expansible chamber defined by said piston and said cylinder having a fluid outlet adapted to limit fluid flow therefrom, a metering valve tube mounted on said piston, a fluid inlet for introducing pressurized fluid into said metering valve tube and a metering valve rod mounted on said cylinder reciprocably telescoped in said metering tube, said metering rod defining a metering surface extending longitudinally therealong a predetermined distance, a housing on the lower end of said metering tube, a bushing provided by said housing receiving said metering rod in slidable relationship therein and a resilient seal secured in said housing in snug sealing relationship to said rod at surfaces thereof external to said metering surface, said seal cooperating with said rod to prevent fluid flow from said metering tube into said expansible chamber when said strut is in a predetermined extended position and cooperating with said rod and said metering surface to define a metering orifice sufficient to maintain a predetermined length of the strut when said metering surface extends above said seal a predetermined amount.

2. In a leveling system including a piston and cylinder defining an expansible chamber having a flow-limiting outlet, a metering valve including a metering tube and a metering rod telescopically received in said metering tube and movable reciprocably by said piston and said cylinder, a fluid inlet for introducing pressurized fluid into said metering tube, a metering valve seal comprising a housing threadedly secured to the lower end of said metering tube and defining a bushing adapted to receive said metering rod in slidable relationship therein and a relatively wide, annular recess above said bushing, and a resilient annular seal fitting snugly in said annular recess and engaging said metering rod in sealing relationship when said metering rod is reciprocated outwardly from said metering tube a predetermined extent, said seal being configured to cooperate with said rod in affording controlled flow to said chamber in relatively retracted positions of said rod.

3. A metering valve seal for use in a leveling system or the like comprising a metering tube, an inlet for said metering tube for receiving fluid from a source of fluid supply, a metering rod telescopically and reciprocably received in said metering tube, a housing element on the lower end of said metering tube defining a bushing coaxial with said metering tube and slidably receiving said metering rod in relatively close fitting relationship therewith and having a relatively wide recess above said bushing, and a resilient seal secured in said recess, said seal engaging said rod in completely sealing relationship when said rod is drawn outwardly from said tube by a predetermined extent and cooperating with said rod in metering fluid through said housing when said rod extends inwardly into said tube a predetermined extent.

4. A metering valve seal for use in a leveling system or the like comprising a metering tube, an inlet for said metering tube for receiving fluid from a source of fluid supply, a metering rod telescopically and reciprocably received in said metering tube, a housing element on the lower end of said metering tube defining a bushing coaxial with said metering tube and slidably receiving said metering rod with a predetermined amount of allowance therebetween and a relatively wide recess above said bushing, and a resilient seal secured in said recess, said seal engaging said rod in completely sealing relationship when said rod is drawn outwardly from said tube by a predetermined extent and cooperating with said rod in metering fluid through said housing when said rod extends inwardly into said tube a predetermined extent.

5. In a metering valve for use in a leveling system for a vehicle suspension or the like having a metering tube, a fluid inlet for said metering tube and a metering rod telescopically and reciprocably received in said metering tube, a bushing carried by said metering tube and slidably receiving said metering rod in coaxial relationship with said metering tube, and a metering valve seal carried by said bushing engaging said metering tube in sealing relationship therewith when said metering rod is moved outwardly from said metering tube by a predetermined extent and cooperating with said rod in affording controlled flow from said metering tube in a relatively retracted position of said rod.

6. In a metering valve for use in a strut mounted between an axle and frame of a vehicle and having a metering tube, a fluid inlet for said metering tube and a metering rod telescopically received in said tube for relative reciprocable movement by opposite ends of said strut, a resilient metering valve seal carried by said metering tube and dimensioned and positioned to afford full sealing engagement with said metering rod in an extended position of said metering rod and to cooperate with said metering rod in affording predetermined controlled flow from said metering tube in a relatively retracted position of said metering rod.

7. In a metering valve for use in a strut between an axle and frame of a vehicle and having a metering tube, a fluid inlet for said metering tube and a metering rod telescopically received in said tube for relative reciprocable movement by opposite ends of said strut, a metering surface extending longitudinally for a predetermined distance on said metering rod, and a resilient metering valve seal carried by said metering tube and dimensioned and positoned to afford full sealing engagement with said metering rod in an extended position of said metering rod when said metering surface is substantially below said metering valve seal and to cooperate with said metering rod in affording controlled flow from said metering tube in a relatively retracted position of said metering rod when said metering surface is substantially above said metering valve seal.

8. In a metering valve for use in a strut between an axle and frame of a vehicle and having a metering tube, a fluid inlet for said metering tube and a metering rod telescopically received in said tube for relative reciprocable movement by opposite ends of said strut, a resilient metering valve seal carried by said metering tube and dimensioned and positioned to afford full sealing engagement with said metering rod in an extended position of said metering rod and to cooperate with said metering rod in affording controlled flow from said metering tube in a relatively retracted position of said rod, said metering valve seal having an annular intended configuration such as to define annular upper and lower sealing edges adapted to contact said metering rod, whereby minimal frictional resistance is afforded by said seal.

9. A metering valve seal for use in a strut between an axle and frame of a vehicle comprising a metering tube, a fluid inlet for said metering tube receiving fluid from a source of fluid supply, a metering rod telescopically and reciprocably received in said metering tube, a housing element on the lower end of said metering tube defining a bushing coaxial with said metering tube and slidably receiving said metering rod in relatively close fitting relationship therewith and a relatively wide recess above said bushing, and a resilient seal secured in said recess, said seal engaging said rod in completely sealing relationship when said rod is drawn outwardly from said tube by a predetermined extent and cooperating with said rod in metering fluid through said bushing when said rod extends inwardly into said tube a predetermined extent, said seal having an annular configuration of substantially X shaped construction in cross-section whereby to define inner annular upper and lower sealing edges engaging said metering rod in snug sealing relationship, and outer annular upper and lower edges, said bushing defining a wall at the outer boundary of said recess adapted to snugly engage said outer upper and lower edges to maintain a predetermined contact pressure between said inner upper and lower edges and said metering rod.

10. In a metering valve for use in a vehicle leveling strut connected between an axle and frame of a vehicle and having a piston and a cylinder in telescopic relation, a metering valve tube connected to said piston and having a fluid inlet and a metering valve rod connected to said cylinder, said cylinder containing fluid and having a controlled fluid outlet, said rod being telescopically reciprocable in said metering valve tube in response to expansion or contraction of said strut, a housing threadedly secured on a free end of said metering tube, a bushing provided by said housing, said housing defining a radially outwardly extending shoulder above and said bushing and an annular wall at the outer edge of said shoulder, a resilient annular seal seated on said shoulder in snug egagement with said wall, and an annular retainer in abutting engagement with the upper surface of said seal and the lower end of said metering tube and secured in desirably snug relationship to said seal by predetermined angular rotation of said housing, said metering rod being configured to engage said seal in fully sealing relationship therewith in a relatively extended positon thereof and to define a metering orifice therewith in a relatively retracted position thereof whereby to maintain said strut in level length condition and afford quick return to the level length condition when said strut is compressed or extended.

11. In a metering valve for use in a vehicle leveling strut connected between an axle and frame of a vehicle and having a piston and a cylinder in telescopic relation, a metering valve connected to said piston and having a fluid inlet and a metering valve rod connected to said cylinder, said cylinder containing fluid and having a controlled fluid outlet, said rod being telescopically reciprocable in said metering valve tube in response to expansion or contraction of said strut, a housing threadedly secured on a free end of said metering tube, a bushing provided by said housing, said housing defining a radially outwardly extending shoulder above said bushing and an annular wall at the outer edge of said shoulder, a resilient annular seal on said shoulder in snug engagement with said wall, and an annular retainer in abutting engagement with the upper surface of said seal and the lower end of said metering tube and secured in desirably snug relationship to said seal by predetermined angular rotation of said housing, said metering rod being configured to engage said seal in fully sealing relationship therewith in a relatively extended position thereof and to define a metering orifice therewith in a relatively retracted position thereof whereby to maintain said strut in level length condition and afford quick return to the level length condition when said strut is compressed or extended, said angular rotation of said housing providing a desired loading of said seal such as to afford a desired size for said metering orifice to provide metering during reciprocation of said metering rod relative to said metering valve tube at a desired rate.

12. In a metering valve for use in a leveling system for a vehicle suspension or the like having a metering tube, a flow inlet for said metering tube and a metering rod telescopically and reciprocably received in said metering tube, adjustable means carried by said metering tube and slidably receiving said metering rod in coaxial relationship with said metering tube, and a metering valve seal carried by said adjustable means and engaging said metering tube in sealing relationship therewith when said metering rod is moved outwardly from said metering tube by a predetermined extent and cooperating with said rod in affording controlled flow from said metering tube in a relatively retracted position of said rod, said adjustable means adjustably loading said metering valve seal against said metering tube to vary the flow from said metering tube in said relatively retracted position of said rod as desired.

References Cited in the file of this patent

UNITED STATES PATENTS

| | | |
|---|---|---|
| 2,616,687 | Butterfield | Nov. 4, 1952 |
| 2,743,102 | Seddon et al. | Apr. 24, 1956 |
| 2,802,664 | Jackson | Aug. 13, 1957 |

FOREIGN PATENTS

| | | |
|---|---|---|
| 762,232 | Great Britain | Nov. 28, 1956 |
| 769,540 | Great Britain | Mar. 6, 1957 |